(No Model.)
J. F. MUNSIE.
ELECTRIC WIRE OR CABLE DISTRIBUTING SYSTEM.
No. 356,153. Patented Jan. 18, 1887.
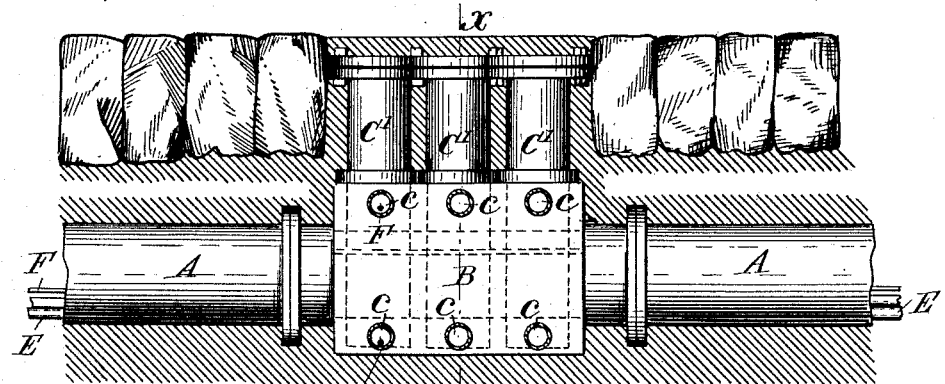
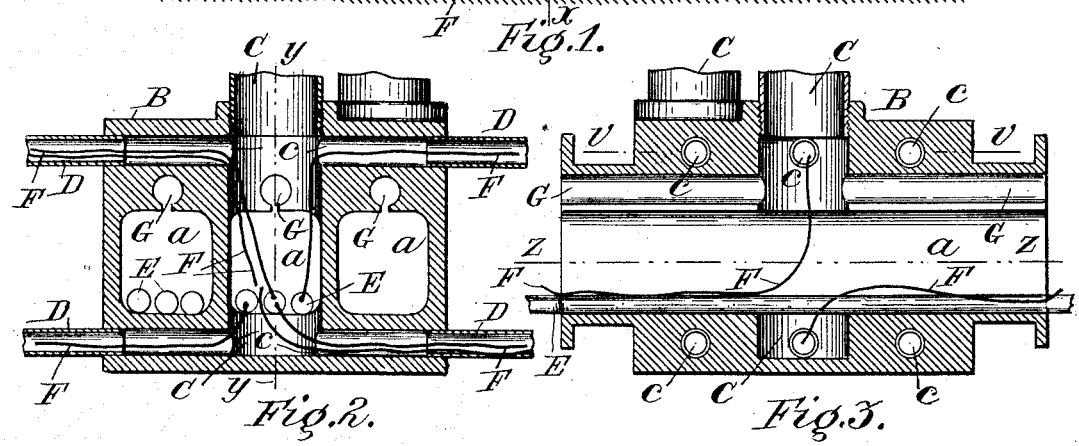
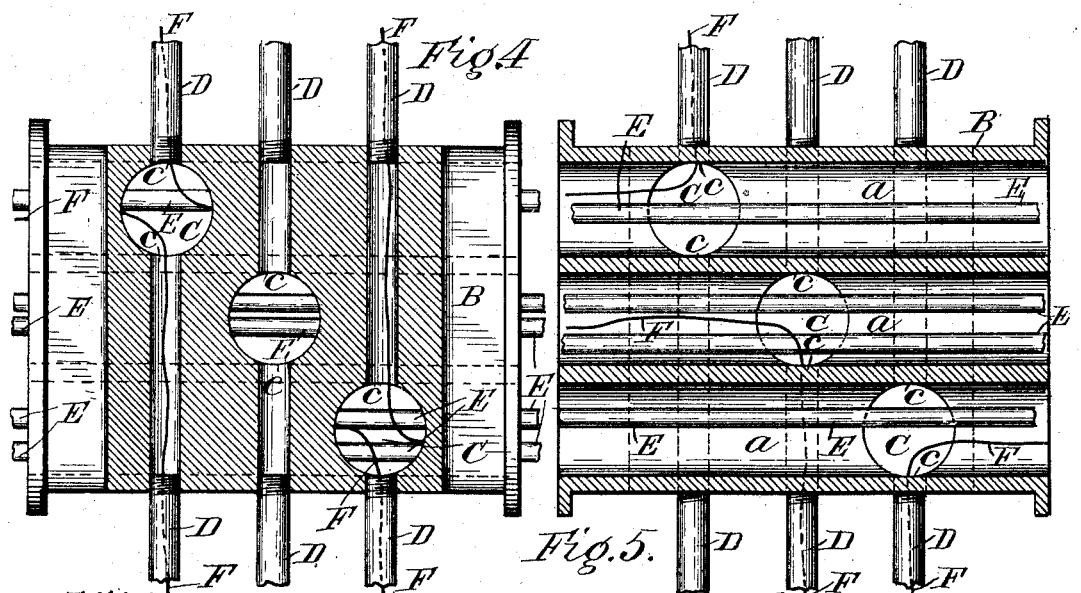
Witnesses:
Saml. B. Dover
Arthur Holliday
Inventor:
James F. Munsie.
Geo. W. LeVin
Att'y

UNITED STATES PATENT OFFICE.

JAMES F. MUNSIE, OF CHICAGO, ILLINOIS.

ELECTRIC WIRE OR CABLE DISTRIBUTING SYSTEM.

SPECIFICATION forming part of Letters Patent No. 356,153, dated January 18, 1887.

Application filed September 18, 1886. Serial No. 213,901. (No model.)

*To all whom it may concern:*

Be it known that I, JAMES F. MUNSIE, a British subject, residing at Chicago, in the county of Cook and State of Illinois, have invented certain new and useful Improvements in Electric Wire or Cable Distributing Stations, of which the following is a full, clear, and exact description, reference being had to the accompanying drawings, and to the letters of reference marked thereon, which form part of this specification.

The principal object of my present invention is to provide within the main line and diverging branches of a conduit system, preferably intermediate main distributing or testing stations, which form part thereof, simple and effective means for distributing service wires or cables at any and all points from which it may be necessary to run the same.

To this end I construct and employ at suitable points throughout the main line or diverging branches of the system a distributing-station of the form substantially illustrated in the accompanying drawings, in which—

Figure 1 is a side elevation illustrating the operative arrangement of my invention and its connection with a conduit laid beneath the street-level. Fig. 2 is a transverse sectional view taken on the line X X of said Fig. 1. Fig. 3 is a longitudinal section of the distributing-station, taken through the center thereof, as indicated by the vertical line Y Y of said Fig. 2. Figs. 4 and 5 are plan sectional views taken through said distributing-station, respectively, on the lines V V and Z Z of said Fig. 3.

It may be observed that in the said views I have illustrated my distributing-station as being applied to a conduit having three parallel cable-ducts. To adapt the station to such form of conduit, it is provided with three corresponding parallel ducts, $a$, which to all intents and purposes simply form continuations of said conduit cable-ducts.

Vertically through said station an opening, C, preferably cylindrical in form, as shown, enters into each one of said ducts $a$, extending below the floor-level thereof to a suitable point, from which it is intersected by one or more transversely-running openings or passages, $c$. Through the upper portion of said station similar transversely-running openings or passages, $c$, intersect said opening C. To the openings or passages $c$ are connected tubes or suitable auxiliary conduits, D, which extend therefrom to the sidewalk, or other desirable point, for the purpose required. When the conduit is located below the street-level, as shown in Fig. 1, each one of said openings C is provided with a suitably-covered extension, C'.

The manner of employment of my said station for wire or cable distributing purposes may be described as follows: An individual wire, F, or cable E, running through the conduit, when entered into a duct, $a$, of the station, is engaged in any suitable manner through the vertical opening C, being then carried into and through an opening or passage, $c$, and thence into and through its tube or auxiliary conduit D to the termination thereof.

In Figs. 2 and 3 I have illustrated at G a duct or passage for each of the chambers $a$, and communicating therewith by means of a longitudinal slot, as shown. This duct is designed for the reception of the hauling-cable when the distributing-station is used in connection with conduits of the kind described in my pending application for Letters Patent filed September 17, 1886, and bearing Serial number 213,790.

What I claim as new, and desire to secure by Letters Patent, is—

In a conduit system for electric wires or cables, the distributing-station B, having a series of passages, $a$, separated from each other throughout their entire extent, and each communicating with and forming a continuation of a separate electric conduit, separate vertical passages C, intersecting said horizontal passages and each located in a different transverse plane with respect thereto, and transverse ducts leading from the passages C, substantially as and for the purposes set forth.

JAMES F. MUNSIE.

Witnesses:
  GEO. H. LEVIN,
  FANNIE A. CASE.